United States Patent
Peng

(10) Patent No.: US 11,490,157 B2
(45) Date of Patent: Nov. 1, 2022

(54) METHOD FOR CONTROLLING VIDEO ENHANCEMENT, DEVICE, ELECTRONIC DEVICE AND STORAGE MEDIUM

(71) Applicant: GUANGDONG OPPO MOBILE TELECOMMUNICATIONS CORP., LTD., Dongguan (CN)

(72) Inventor: Deliang Peng, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/331,508

(22) Filed: May 26, 2021

(65) Prior Publication Data

US 2021/0297734 A1    Sep. 23, 2021

Related U.S. Application Data

(63) Continuation of application No. PCT/CN2019/102907, filed on Aug. 27, 2019.

(30) Foreign Application Priority Data

Nov. 27, 2018 (CN) .......................... 201811428168.7

(51) Int. Cl.
*G06F 16/70* (2019.01)
*H04N 21/44* (2011.01)

(52) U.S. Cl.
CPC .......................... *H04N 21/44008* (2013.01)

(58) Field of Classification Search
CPC ............................................... H04N 21/44008
See application file for complete search history.

(56) References Cited

U.S. PATENT DOCUMENTS

| 10,893,323 B2 | 1/2021 | Diggins |
| 2005/0078944 A1* | 4/2005 | Risan .................... H04N 5/765 360/60 |

(Continued)

FOREIGN PATENT DOCUMENTS

| CN | 1941883 A | 4/2007 |
| CN | 1953519 A | 4/2007 |

(Continued)

OTHER PUBLICATIONS

Supplementary Search Report dated Nov. 30, 2021 From the Extended European search report(EESR) of the Application No. 19889692.0.

(Continued)

*Primary Examiner* — Thai Q Tran
*Assistant Examiner* — Jose M Mesa
(74) *Attorney, Agent, or Firm* — Bayes PLLC

(57) ABSTRACT

A method for controlling video enhancement, a device, an electronic device, and a storage medium are provided. The method includes acquiring video content of a played video after it is detected that the electronic device is in a video playback state; identifying a type of the played video based on the video content; determining whether the type is a target type or not; and performing video enhancement on the played video in response to determining type of the played video being a target type. The video enhancement includes performing enhancement on an image of the played video.

19 Claims, 9 Drawing Sheets

(56) References Cited

U.S. PATENT DOCUMENTS

| | | | |
|---|---|---|---|
| 2006/0072669 A1 | 4/2006 | Lin et al. | |
| 2009/0213272 A1 | 8/2009 | Suzuki | |
| 2009/0313484 A1* | 12/2009 | Millet | G06F 1/3203 |
| | | | 713/300 |
| 2010/0169292 A1* | 7/2010 | Radhakrishnan | G06F 16/70 |
| | | | 707/706 |
| 2015/0058877 A1 | 2/2015 | Lakkundi et al. | |
| 2015/0364159 A1* | 12/2015 | Ushiyama | G11B 31/006 |
| | | | 386/230 |
| 2016/0037067 A1* | 2/2016 | Lee | H04N 5/232935 |
| | | | 348/208.6 |
| 2017/0127063 A1 | 5/2017 | Li et al. | |
| 2017/0171629 A1 | 6/2017 | Soh et al. | |
| 2017/0180752 A1 | 6/2017 | Liu et al. | |
| 2017/0300195 A1* | 10/2017 | Kim | G06F 3/0482 |
| 2018/0261183 A1 | 9/2018 | Gou et al. | |
| 2019/0327470 A1 | 10/2019 | Li et al. | |

FOREIGN PATENT DOCUMENTS

| | | | |
|---|---|---|---|
| CN | 101521739 A | 9/2009 | |
| CN | 103106886 A | 5/2013 | |
| CN | 104202604 A | 12/2014 | |
| CN | 104378688 A | 2/2015 | |
| CN | 104853244 A | 8/2015 | |
| CN | 105744118 A | 7/2016 | |
| CN | 105893927 A | 8/2016 | |
| CN | 105898364 A | 8/2016 | |
| CN | 106534962 A | 3/2017 | |
| CN | 106782431 A | 5/2017 | |
| CN | 107241590 A | 10/2017 | |
| CN | 108595970 A | 9/2018 | |
| CN | 108830208 A | 11/2018 | |
| CN | 109640169 A | 4/2019 | |
| EP | 3751418 A1 | 12/2020 | |
| JP | 2005094072 A | 4/2005 | |
| JP | 2008236603 A | 10/2008 | |
| JP | 2009296113 A | 12/2009 | |
| JP | 2010541009 A | 12/2010 | |
| JP | 2012226107 A | 11/2012 | |
| WO | WO-2013183582 A1 * | 12/2013 | G06F 3/0412 |

OTHER PUBLICATIONS

International Search Report and the Written Opinion dated Nov. 27, 2019 From the International Searching Authority Re. Application No. PCT/CN2019/102907.

The first Office Action dated Jan. 2, 2020 from from China Application No. 201811428168.7.

The second Office Action dated Apr. 1, 2020 from from China Application No. 201811428168.7.

Notice of Allowance dated Jul. 28, 2020 from from China Application No. 201811428168.7.

First Examination Report dated Mar. 7, 2022 from the Indian Application No. 202127028488, 5 pages.

Notice of Reasons for Rejection dated Jun. 21, 2022 from the Japanese Application No. 2021-529683.

* cited by examiner

METHOD FOR CONTROLLING VIDEO ENHANCEMENT, DEVICE, ELECTRONIC DEVICE AND STORAGE MEDIUM

CROSS REFERENCE TO RELATED APPLICATIONS

This application is a continuation application of International Application No. PCT/CN2019/102907, filed on Aug. 27, 2019, which claims priority to Chinese Application No. 201811428168.7, filed on Nov. 27, 2018, the entire contents of which are incorporated herein by reference.

BACKGROUND

The present disclosure relates to the field of image processing technology, more particularly, to a method for controlling video enhancement, a device, an electronic device and a storage medium.

With the development of society, the application range of electronic devices with screens has been continuously expanding. For example, the screen is utilized to display images, such as pictures and videos, and the like. The display quality of most electronic devices will be severely affected due to changes of the surrounding light sources or the quality of the videos being played.

SUMMARY

In view of the above problem, the present disclosure provides a method for controlling video enhancement, a device, an electronic device and a storage medium to improve the above problem.

One aspect of the present disclosure provides a method for controlling video enhancement applied to an electronic device. The method includes acquiring video content of a played video after it is detected that the electronic device is in a video playback state; identifying a type of the played video based on the video content; determining whether the type is a target type or not; and performing video enhancement on the played video in response to determining type of the played video being a target type.

Another aspect of the present disclosure provides a device for controlling video enhancement operating on an electronic device. The device includes a video content acquisition unit configured to acquire video content of a played video after detecting that the electronic device is in a video playback state; a video type identification unit configured to identify a type of the played video based on the video content; a type determination unit configured to determine whether the type is a target type of not; and a video enhancement control unit configured to perform video enhancement on the played video in response to determining type of the played video being a target type.

Still another aspect of the present disclosure provides an electronic device including one or more processors, a video coder/decoder and a memory. One or more program codes are stored in the memory and executable by the one or more processors to perform the method as disclosed above.

Still another aspect of the present disclosure provides a computer readable storage medium storing one or more program codes executable by a processor to perform the method as disclosed above.

BRIEF DESCRIPTION OF THE DRAWINGS

To describe the technical solutions in the embodiments of this disclosure more clearly, the following briefly introduces the accompanying drawings required for describing the embodiments. Apparently, the accompanying drawings in the following description show merely some embodiments of this disclosure, and a person of ordinary skill in the art may still derive other drawings from these accompanying drawings without creative efforts.

DETAILED DESCRIPTION

To help a person skilled in the art better understand the solutions of the present disclosure, the following clearly and completely describes the technical solutions in the embodiments of the present disclosure with reference to the accompanying drawings in the embodiments of the present disclosure. Apparently, the described embodiments are a part rather than all of the embodiments of the present disclosure.

All other embodiments obtained by a person of ordinary skill in the art based on the embodiments of the present disclosure without creative efforts shall fall within the protection scope of the present disclosure.

As the hardware performance of electronic devices improves, more electronic devices can support video playback. For example, the electronic device can be operated at a video playback client end, and then a video requested from the network is played through the video playback client end. Or, a web browser can be run, and then a video is played in the web browser. Or, the electronic device can use video playback software to play locally stored video files.

Regardless of whether the played video is transmitted on the network or stored locally, when the video is generated, the generated video will be compressed in order to reduce the storage space occupied and facilitate transmission on the network. Correspondingly, when the electronic device acquires the video, the video that has been compressed and encoded is first acquired. In this situation, the electronic device will first perform video decoding on the video that has been compressed and encoded.

Figure 1:
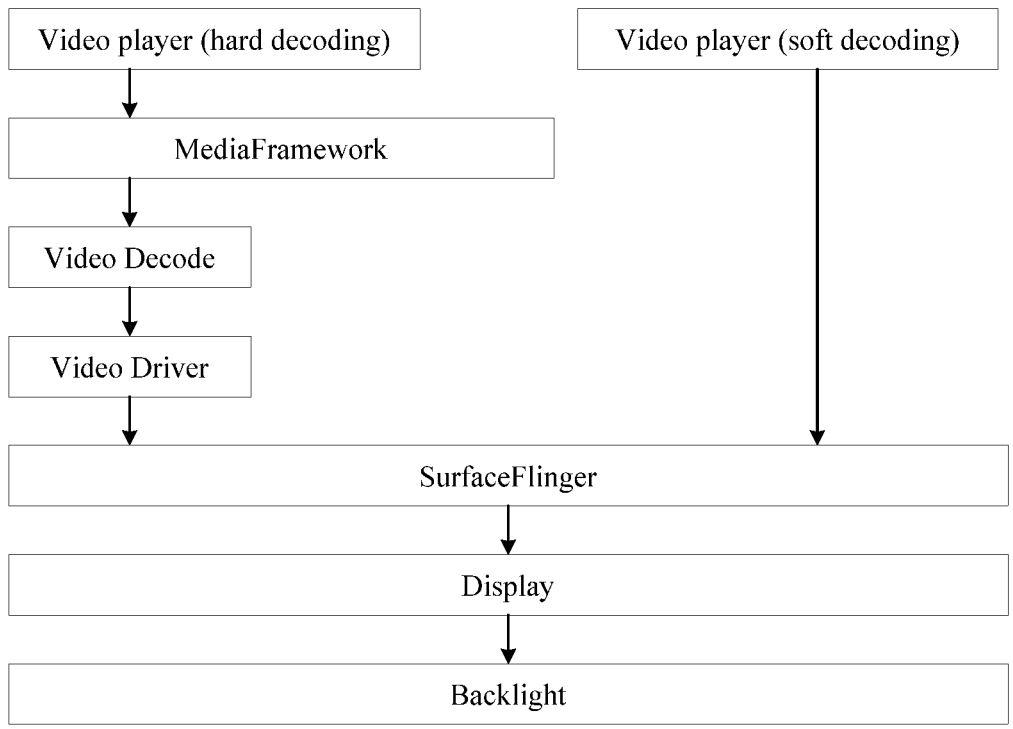
FIG. 1 is a flowchart of another video decoding according to the present disclosure.

As shown in FIG. 1, the electronic device can perform video decoding through two types of methods, that is, hard decoding and soft decoding. Hard decoding refers to performing decoding other than using a CPU, such as using a graphics processing unit (GPU), a specific DSP, an FPGA, an ASIC chip, etc. Soft decoding refers to performing decoding by using a CPU.

As shown in FIG. 1, a MediaFramework (multimedia framework) acquires a video file to be played through an API interface of a client end or a web browser, and submits it to a Video Decode (video decoder). Here, the MediaFramework (multimedia framework) is a multimedia framework in an operating system.

Regardless of whether it is hard decoding or soft decoding, decoded video data is sent to a SurfaceFlinger (layer transfer module) after the video data is decoded, and the decoded video data is displayed on a screen after being rendered and synthesized by the SurfaceFlinger. The SurfaceFlinger performs an independent Service. It receives all Surfaces as an input, calculates a position of each Surface in a final synthesized image based on parameters, such as ZOrder, transparency, size, location, etc., and then submits it to HWComposer or OpenGL to generate a Buffer that is finally displayed. After that, the Buffer that is finally displayed is displayed on a specific display device.

The inventor found that a visual enhancement process can be added to either the hard decoding or the soft decoding process, so that the subsequently played video has a better visual effect. For example, denoising can be performed on an edge of the video, exposure can be adjusted or definition can be improved based on the HQV (hollywood quality video) technology. In addition, some other methods can further be used to improve the visual experience of the video being played, for example, to enhance the vividness of the colors.

However, the inventor further found that the method for controlling whether to perform visual enhancement on the played video or not still needs to be improved. For example, with the increases in video acquisition paths and methods, more and more types of videos can be played. The types of videos that can be played include avi, rmvb, and wma, etc. Additionally, the duration of different videos varies. Some videos are only a few seconds in duration, while some videos are more than one or even several hours in duration. For different types of videos and videos of different durations, electronic devices cannot flexibly determine how to perform video enhancement and whether to perform video enhancement is necessary or not. Therefore, the present disclosure provides a method for controlling video enhancement, a device, an electronic device and a storage medium that can improve control convenience and intelligence.

The present disclosure is described in conjunction with specific embodiments as follows.

Figure 2:
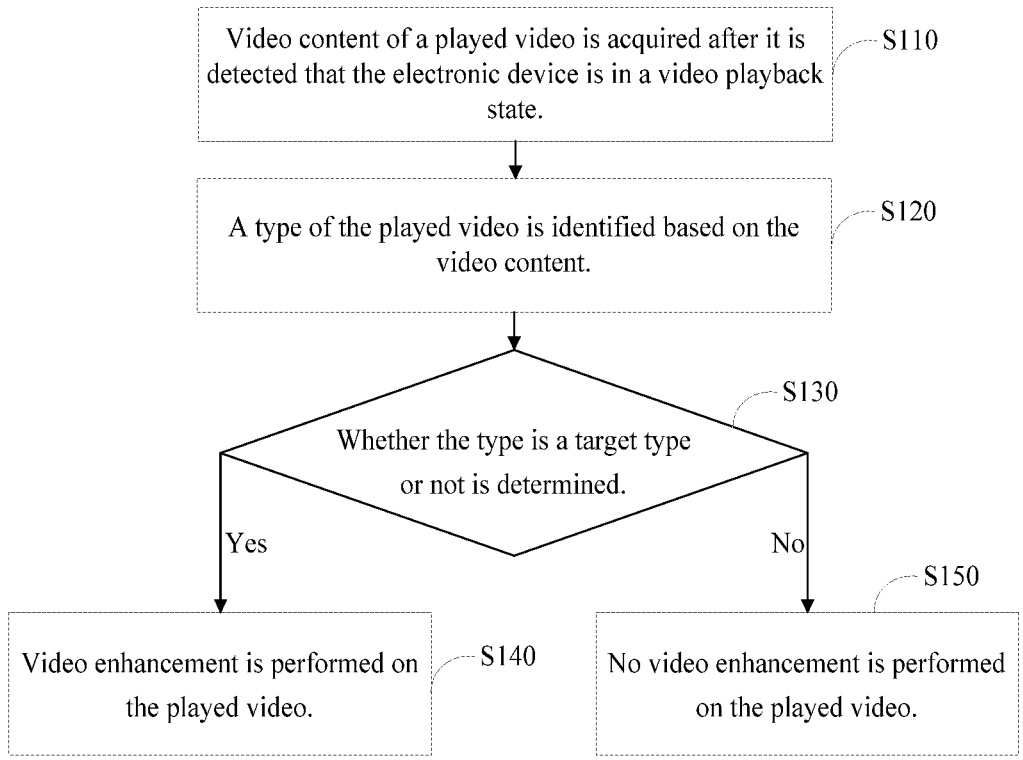
FIG. 2 is a flowchart of a method for controlling video enhancement according to one embodiment of the present disclosure.

A description is provided with reference to FIG. 2. The present disclosure provides a method for controlling video enhancement applied to an electronic device. The method includes the steps as follows.

At block S110, video content of a played video is acquired after it is detected that the electronic device is in a video playback state.

In the present disclosure, the electronic device can identify whether it is currently in the video playback state or not through a variety of methods.

As one method, the step of detecting whether the electronic device is in the video playback state or not includes Whether there is a set video playback application running in the electronic device or not is detected. If it is detected that there is the set video playback application that is running, it is determined that the electronic device is in the video playback state. The electronic device may pre-establish a list of video playback applications, so as to record the video playback applications on the list. The list can be freely configured by a user of the electronic device, or can be determined based on the usage situation of a certain video playback application.

Figure 3:
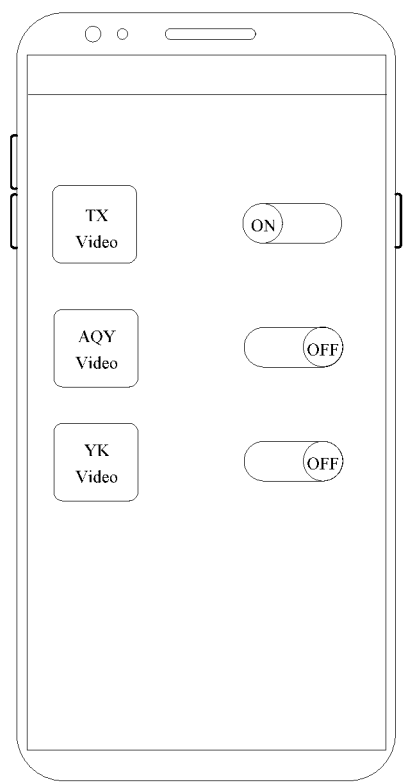
FIG. 3 is a schematic diagram of an interface of a method for controlling video enhancement according to one embodiment of the present disclosure.

As shown in FIG. 3, a plurality of applications and a state corresponding to each of the applications are displayed on an interface shown in FIG. 3. It can be understood that if the state corresponding to the application is "Off" as shown in the figure, it means that the application is removed or not added to the above list. If the state corresponding to the application is "On" as shown in the figure, it means that the application is added to the above list. For example, for an application named "TX Video", its corresponding state is "On", which means that the application "TX Video" will exist in the aforementioned list. As for an application named "AQY Video", its corresponding state is "Off", which means that the application "AQY Video" will not exist in the aforementioned list.

In addition to that, the electronic device can detect a usage frequency of each of the video playback applications. If it detects that the usage frequency of a certain video playback application exceeds a set frequency, it can add the video playback application to the above list, and correspondingly configure the state corresponding to a name of the video playback application in FIG. 3 as "on".

In this situation, the electronic device can first detect which application is currently running in a foreground, and then further detect whether the application currently running in the foreground is on the list or not. If it is on the list, then it is determined that the electronic device is currently in the video playback state. As one method, if the electronic device operates in the Android operating system, the name of the application currently running in the foreground can be obtained by executing the getRunningTasks method of ActivityManager. In addition, the electronic device can obtain a list of applications used by the user through the UsageStatsManager, and identify the most recently used application recorded on the list as a current foreground application. Additionally, the electronic device can monitor a change of window focus through Android's own Accessibility function, and get the package name corresponding to a focused window as the application currently running in the foreground.

As another method, the electronic device can detect a return value of the AudioManager class to determine whether there is a video currently being played or not. In this situation, the electronic device can first detect the return value of the AudioManager class to determine whether there is an audio output or not. If it is detected that there is the audio output, it can further determine whether the electronic device is in the video playback state or not based on the above detection, which indicates whether there is a video playback application running or not.

Figure 4:
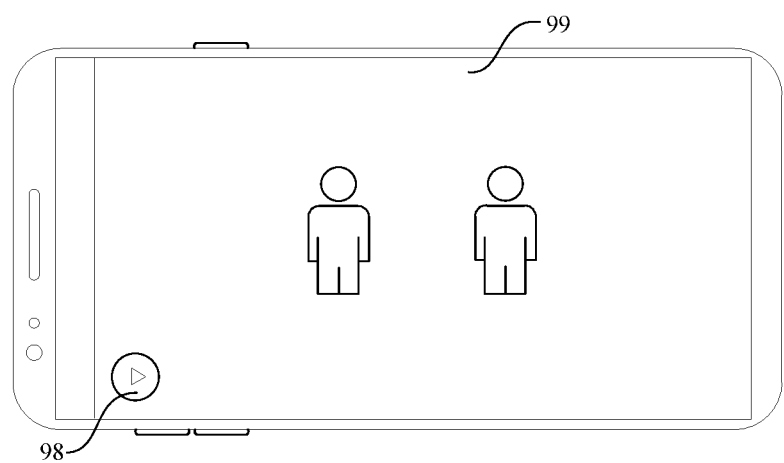
FIG. 4 is a schematic diagram of a video playback interface of a method for controlling video enhancement according to one embodiment of the present disclosure.

As still another method, the electronic device can detect whether it is in the video playback state or not by detecting a touch state of a video play button. For example, as shown in FIG. 4, a play button 98 is displayed on a video playback interface 99 shown in FIG. 4, and the interface of FIG. 4 shows a state in which the video playback is paused. In this situation, after it is detected that the play button 98 is touched, it can be determined that the electronic device is currently in the video playback state.

The acquired video content can also be acquired through a variety of methods.

As one method, the electronic device can acquire video content of the played video from content that has already been played. It can be understood that after the electronic device is triggered to start playing the video, it will start to read a video file from a video source to perform a playback. As for whether the electronic device is in the video playback state or not, the electronic device needs to spend a certain amount of time to detect. Then, after the electronic device actually detects that it is in the video playback state, the electronic device may have played video content for a certain period of time.

Generally, the electronic device caches the video that has been played. In this situation, the electronic device can read the video content of the played video from video content that has been cached. For example, after the electronic device is triggered to perform a video playback, it will start to play the video immediately, so that the electronic device may not detect that it is in the video playback state after playing for 2 seconds. Then, if the electronic device has played and cached 5 MB of content during the aforementioned 1-second playback, the electronic device can acquire the video content of the played video from the 5 MB of content that has been cached. Optionally, the electronic device can read part of the content of the cached content as the acquired video content of the played video, or can use all of the content of the cached content as the acquired video content of the played video.

As another method, after detecting that the electronic device is in the video playback state, it can read the video content of a period of time from a time point the video playback state is detected as the video content of the played video. For example, after the electronic device detects that it is in the video playback state, it can read the 5 MB of video content after the time point the video playback state is detected again as the acquired video content of the played video.

Then, based on the foregoing methods of acquiring the video content, the electronic device can determine how to acquire the video content depending on practical situations, thus achieving flexible acquisition of the video content.

In one state, the video played by the electronic device is acquired from the network, and usually it takes a certain amount of time to transmit video data from the network (for example, a server that stores video files) to the electronic device. Hence, in this situation, if the video played by the electronic device is acquired from the network, the electronic device can read the video content of a designated duration after the time point the video playback state is detected again, after detecting that it is in the video playback state, as the acquired video content of the played video. In this manner, the electronic device can acquire sufficient video content for subsequent determination of a video type, so as to avoid that the electronic device has not yet cached enough video content due to network congestion, which subsequently causes the electronic device to be unable to accurately determine the type of the video content. Sufficient video content may be video content that occupies a storage space larger than a set threshold.

As another method, if the electronic device detects that the played video is read locally, then it can directly acquire the video content of the designated duration in a cached video from the video source after detecting that it is in the video playback state as the acquired video content of the played video. It can be understood that if all video content of the played video has already been stored in the electronic device locally, then the electronic device can acquire the video content for the subsequent determination of the video type starting from any position in the locally stored video content during the process that the electronic device acquires the video content for the subsequent determination of the video type (that is, acquire the video content of the played video in step S110).

For example, if the video currently being played by the electronic device is a locally stored video named A, and a duration of the video A is 1 hour, then the electronic device can acquire video content of a customized duration starting from any position in the 1-hour video content during the process that the electronic device acquires the video content for the subsequent determination of the video type. For example, video content of 5 seconds can be acquired from the 5th minute of the video content as the video content for the subsequent determination of the video type. Additionally, video content of 10 seconds can also be acquired directly from the 30th minute of the video content as the video content for subsequent determination of the video type.

Step S120: A type of the played video is identified based on the video content.

Types of the video may include a short video type, a TV series type, a movie type and a teaching video type, etc. It can be understood that a duration of video content of the TV series type is usually between 30 and 50 minutes, and is shorter than a duration of video content of the movie type. A duration of video content of the short video type is usually only a few minutes or even tens of seconds. However, a background of video content of the teaching video type usually remains unchanged, and only text will change. Then, as one method, the electronic device can identify the type of the played video based on the above-mentioned video characteristics.

At block S130, it is determined whether the type is a target type or not.

At block S140, video enhancement is performed on the played video in response to determining type of the played video being a target type.

During the process that the electronic device performs the video enhancement, it can enhance display brightness, enhance the set color temperature RGB gain, enhance the color of the video picture, and enhance the contrast of the video picture, etc. It can be understood that if the electronic device has activated video enhancement, it needs to consume more CPU resource or GPU resource. In this situation, as one method, in response to determining type of the played video being a target type, a trigger control for activating video enhancement is displayed. If a touch operation acting on the trigger control is detected, video enhancement is performed on the played video.

Figure 5:
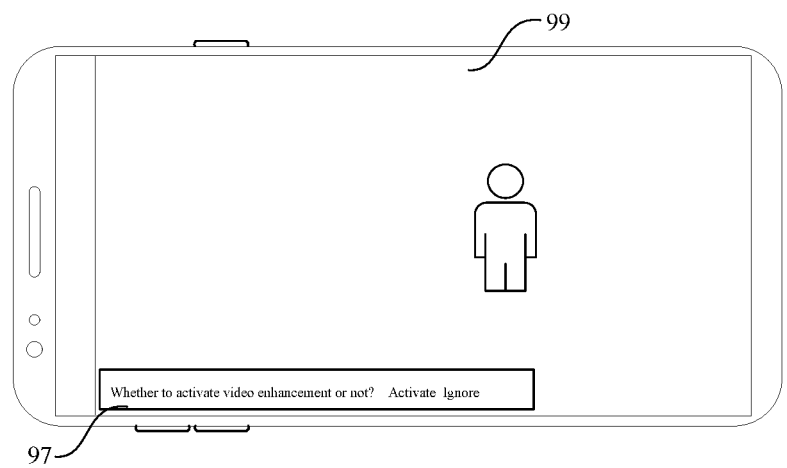
FIG. 5 is a schematic diagram of prompting a message of a method for controlling video enhancement according to one embodiment of the present disclosure.

The trigger control for activating video enhancement can be used for displaying a prompt message and allow the user to select whether to activate or not through the touch operation. For example, as shown in FIG. 5, when it is detected that the type of the played video is the target type, a control 97 is displayed, and a prompt message "whether to activate video enhancement or not" is displayed on the control 97. In addition to that, a touch control whose content is "Activate" and a touch control whose content is "Ignore" are displayed on the control 97. After detecting a touch operation acting on the touch control whose content is "Activate", it is determined that video enhancement is activated to further perform video enhancement on the played video. After detecting a touch operation acting on the touch control whose content is "ignore", the control 97 is hidden.

In addition to the aforementioned touch control method, there may be some other methods for the user to trigger whether to perform video enhancement or not. For example, after it is determined that the type of the played video is the target type, a prompt message can be displayed on a playback interface to prompt the user to achieve the objective of determining to perform video enhancement through changing a motion state of a certain part of his/her body. In this situation, the electronic device can start to detect whether the user has made a movement corresponding to the prompt message, and if it is determined that the user has made the movement corresponding to the prompt message, video enhancement is started. As one method, the electronic device can prompt the user to shake the electronic device, and after the electronic device detects that it is in a shaking state, it determines that the user has shaken the electronic device to further determine to activate video enhancement. In addition, as another method, the electronic device can further display a prompt message for prompting the user to blink quickly, so that it determines to activate video enhancement after detecting that the user blinks quickly. Of course, as for which specific prompt message displayed by the electronic device to prompt the user whether to activate video enhancement or not, the electronic device can determine through acquiring content of stored configuration information. In this situation, the user can use a setting interface of the electronic device to set the type of prompt message needed by himself/herself.

Figure 6:
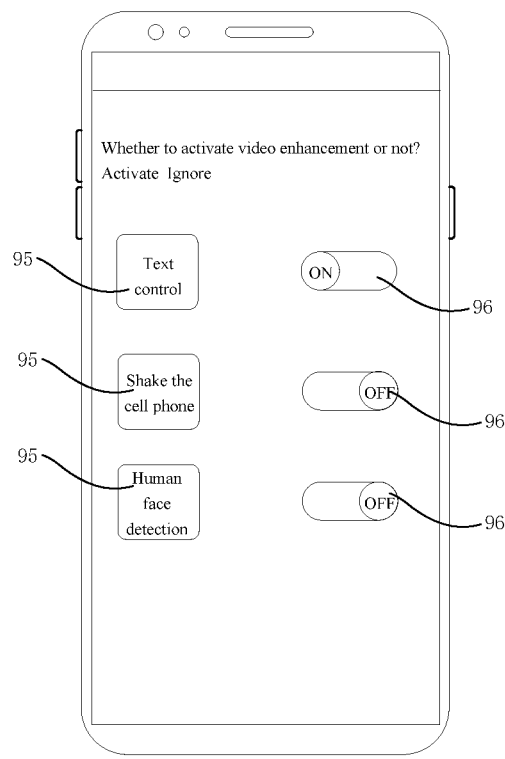
FIG. 6 is a schematic diagram of a configuration interface for determining to activate video enhancement of a method for controlling video enhancement according to one embodiment of the present disclosure.

As shown in FIG. 6, on a setting interface of FIG. 6 controls 95 identifying determination methods and switch controls 96 corresponding to the controls 95 are displayed. When the switch control 96 is in an "on" state, it indicates that the corresponding determination method is activated. It can be understood that for multiple determination methods, only one is selected. That means, after one of the methods is determined to be activated, the other methods are automatically determined to be in a disabled state.

Performing video enhancement processing on the video content may include at least one of exposure enhancement, de-noising, edge sharpening, contrast enhancement, and saturation enhancement of the video content. Then, in response to determining type of the played video being a target type, the step of performing video enhancement on the played video includes obtaining a designated image parameter corresponding to the target type, in which the designated image parameter is selected from an image parameter of the played video; and adjusting the designated image parameter to perform enhancement on an image of the played video. The image parameter includes at least one of a definition adjustment parameter, a lens stretching control parameter, a color adjustment parameter, a sharpness adjustment parameter, a brightness adjustment parameter, a contrast adjustment parameter, a color gamut control parameter, a purity control parameter, a noise reduction control parameter and a saturation adjustment parameter. It can be understood that different types of videos can be adjusted by selecting different parameters from the above image parameter. For example, for videos of the target type, the above-mentioned image parameter can all be adjusted, while for videos not of the target type, only part of the image parameter can be adjusted.

In greater detail, the video content displayed by the electronic device is decoded image content. Since the decoded image content is RGBA format data, it is necessary to convert the RGBA format data into HSV format data in order to optimize the image content. In greater detail, a histogram of the image content is obtained, and a statistical analysis is made to the histogram to obtain a parameter for converting the RGBA format data into the HSV format data. Then, the RGBA format data is converted into the HSV format data based on the parameter.

Exposure enhancement is used to increase brightness of an image. Through using a histogram of the image, brightness of areas having a lower brightness value is increased. Additionally, the brightness of the image can be increased through non-linear superposition. In greater detail, I represents a darker image to be processed, T represents a brighter image after being processed, then the exposure enhancement method is $T(x)=I(x)+(1-I(x))*I(x)$. Here, T and I are both images with values of [0,1]. Optionally, the algorithm can iterate multiple times if the effect is not good with only performing one time.

Denoising the image content is used to remove noises of the image. In greater detail, the image is often interfered with and affected by various noises during the generation and transmission process, which will degrade the image quality. This has an adverse effect on subsequent image processing and image visual effects. There are many types of noises, such as an electrical noise, a mechanical noise, a channel noise and some other noise. Therefore, in order to suppress noises, improve image quality, and facilitate higher-level processing, it is necessary to perform denoising preprocessing on the image. From the view point of probability distribution of noises, they can be divided into Gaussian noise, Rayleigh noise, gamma noise, exponential noise and uniform noise.

In greater detail, the image can be denoised by using a Gaussian filter, in which the Gaussian filter is a linear filter that can effectively suppress noises and smooth the image. Its working principle is similar to that of the mean filter, and both take the mean value of pixels in the filter window as the output. However, its coefficient of window template is different from that of the mean filter. The template coefficient of the mean filter is always 1, while the template coefficient of the Gaussian filter decreases as the distance from the center of the template increases. Therefore, the Gaussian filter has a smaller degree of blurring of the image as compared with the mean filter.

For example, a 5×5 Gaussian filter window is generated, and the center position of the template is taken as the origin of coordinates for sampling. The coordinates of each position of the template are substituted into the Gaussian function, and the value obtained is the coefficient of the template. The Gaussian filter window is then convolved with the image to denoise the image.

Edge sharpening is used to make blurred images clearer. There are usually two methods for image sharpening: one is a differentiation method, and the other is a high-pass filtering method.

Contrast increase is used to improve the image quality, thus making the colors of the image more vivid. In greater detail, contrast stretching is one method of image enhancement, and it also belongs to gray-level transformation operations. Through the gray-level transformation, the gray-level value is stretched to the entire 0-255 interval, then the contrast is obviously greatly improved. The following formula can be used to map the gray-level value of a specific pixel to a larger gray-level space:

$$I(x,y)=[(I(x,y)-I\min)/(I\max-I\min)](MAX-MIN)+MIN;$$

Here Imin and Imax are the minimum and maximum gray-level values of the original image, and MIN and MAX are the minimum and maximum gray-level values of the gray-level space to be stretched to.

Step S150: No video enhancement is performed on the played video in response to determining type of the played video being not the target type.

The method for controlling video enhancement according to the present disclosure acquires the video content of the played video after detecting that the electronic device is in the video playback state, and identifies the type of the played video based on the video content, and then determines whether the type is the target type or not. In response to determining type of the played video being a target type, video enhancement is performed on the played video. Therefore, through the present method, the type of the video can be determined based on the content of the played video, and whether the type is the target type or not is further determined to determine whether to perform video enhancement on the played video or not, which improves the flexibility of the activating method of video enhancement.

Figure 7:
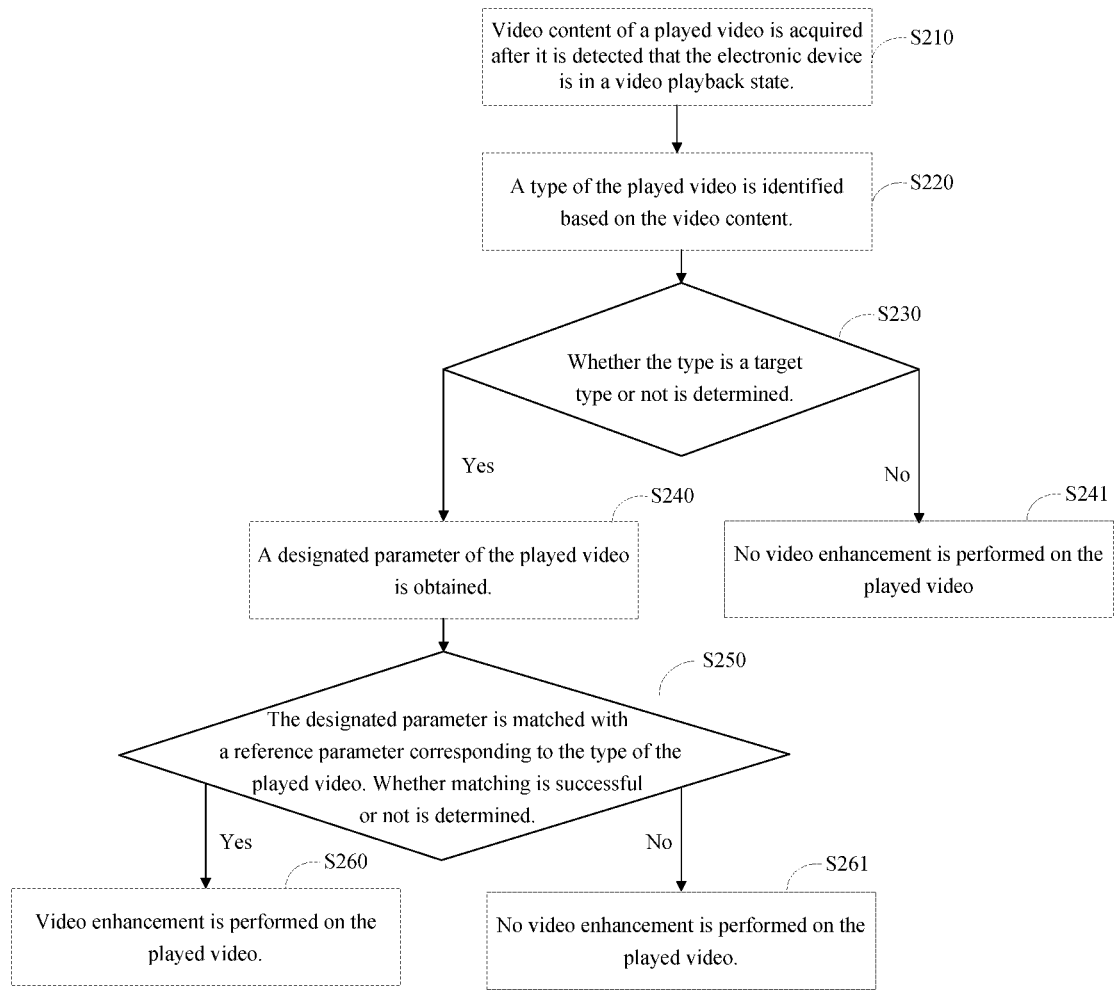
FIG. 7 is a flowchart of a method for controlling video enhancement according to another embodiment of the present disclosure.

A description is provided with reference to FIG. 7. The present disclosure provides a method for controlling video enhancement applied to an electronic device. The method includes the steps as follows.

At block S210, video content of a played video is acquired after it is detected that the electronic device is in a video playback state.

At block S220, a type of the played video is identified based on the video content.

At block S230, it is determined whether the type is a target type or not.

At block 240, a designated parameter of the played video is obtained in response to determining type of the played video being a target type.

At block S241, no video enhancement is performed on the played video in response to determining type of the played video being not the target type.

At block Step 250, the designated parameter is matched with a reference parameter corresponding to the type of the played video.

It can be understood that different types of videos will differ in some parameter characteristics. The reference parameters corresponding to each type of video will have certain type characteristics.

Take TV series videos as an example, usually a duration of the TV series videos is between 35 and 50 minutes, and the TV series videos have opening songs at the beginning of the videos and ending songs at the end of the videos. As one method, for a video that has been marked with the opening part, the main part and the ending part by marking symbols, the electronic device can identify the video according to the marking symbols. As another method, the electronic device can distinguish the opening part, the main part and the ending part based on determining whether the video stream corresponds to the audio stream having set content or not. It can be understood that the opening part and the ending part are usually accompanied by the opening and ending songs, and then the electronic device can identify whether it is a TV series video or not through detecting parts corresponding to the opening and ending songs.

Then, take a teaching video as an example, text content is usually displayed in most areas of the video picture of the teaching video, and even a human face image is always displayed in one area in some teaching videos. In this situation, the electronic device may determine whether a same human face image is always displayed in a fixed area or not under the circumstances that a video is preliminarily determined to be a teaching video, so as to determine whether the video is the teaching video or not.

In addition to that, the other types of videos can also have their own video characteristics correspondingly. For example, a duration of movie videos is usually from about 90 minutes to about 120 minutes.

In this situation, after performing step S230 to preliminarily determine the type of the played video, the electronic device may further obtain the designated parameter corresponding to the preliminarily determined video type, so as to further determine whether the type is the preliminarily determined video type or not. Thus, the accuracy of the determined type is improved.

If the electronic device preliminarily determines that the type of the played video is a TV series type, the electronic device can further determine the duration of the played video to be the designated parameter, and match the duration with the preset reference parameter corresponding to the TV series video (at this time, the duration corresponding to the video type). If matching is successful, it can be determined that the type of the played video is the TV series type.

In addition, under the circumstances that the reference parameter of the teaching video is determined to be a proportion of the video picture occupied by text that exceeds a set ratio, the electronic device can further match a proportion of the video picture of the played video occupied by text with the reference parameter (at this time, the proportion occupied by the text) if it preliminarily determines that the type of the played video is a teaching video type. If matching is successful, it can be determined that the type of the played video is the teaching video type.

For each type of reference parameter, it can be configured based on historical data, or it can be configured based on machine learning. As one method, in response to determining type of the played video being a target type, before a step of performing video enhancement on the played video the method further includes acquiring a designated number of videos of the type; and performing machine learning on the designated number of videos of the type to obtain the reference parameter corresponding to the type.

At block Step 260, video enhancement is performed on the played video if the matching is successful.

At block Step 261, no video enhancement is performed on the played video if the matching is not successful.

The method for controlling video enhancement according to the present disclosure acquires the video content of the played video after detecting that the electronic device is in the video playback state, and identifies the type of the played video based on the video content, and then determines whether the type is the target type or not. In response to determining type of the played video being a target type, the designated parameter of the played video is obtained to match the designated parameter with the reference parameter corresponding to the type of the played video. If the designated parameter of the played video is successfully matched with the reference parameter corresponding to the type of the played video, video enhancement is performed on the played video. Therefore, through the present method, the type of the video can be determined based on the content of the played video, and whether the type is the target type or not is further determined to determine whether to perform video enhancement on the played video or not, which improves the flexibility of the activating method of video enhancement.

Figure 8:
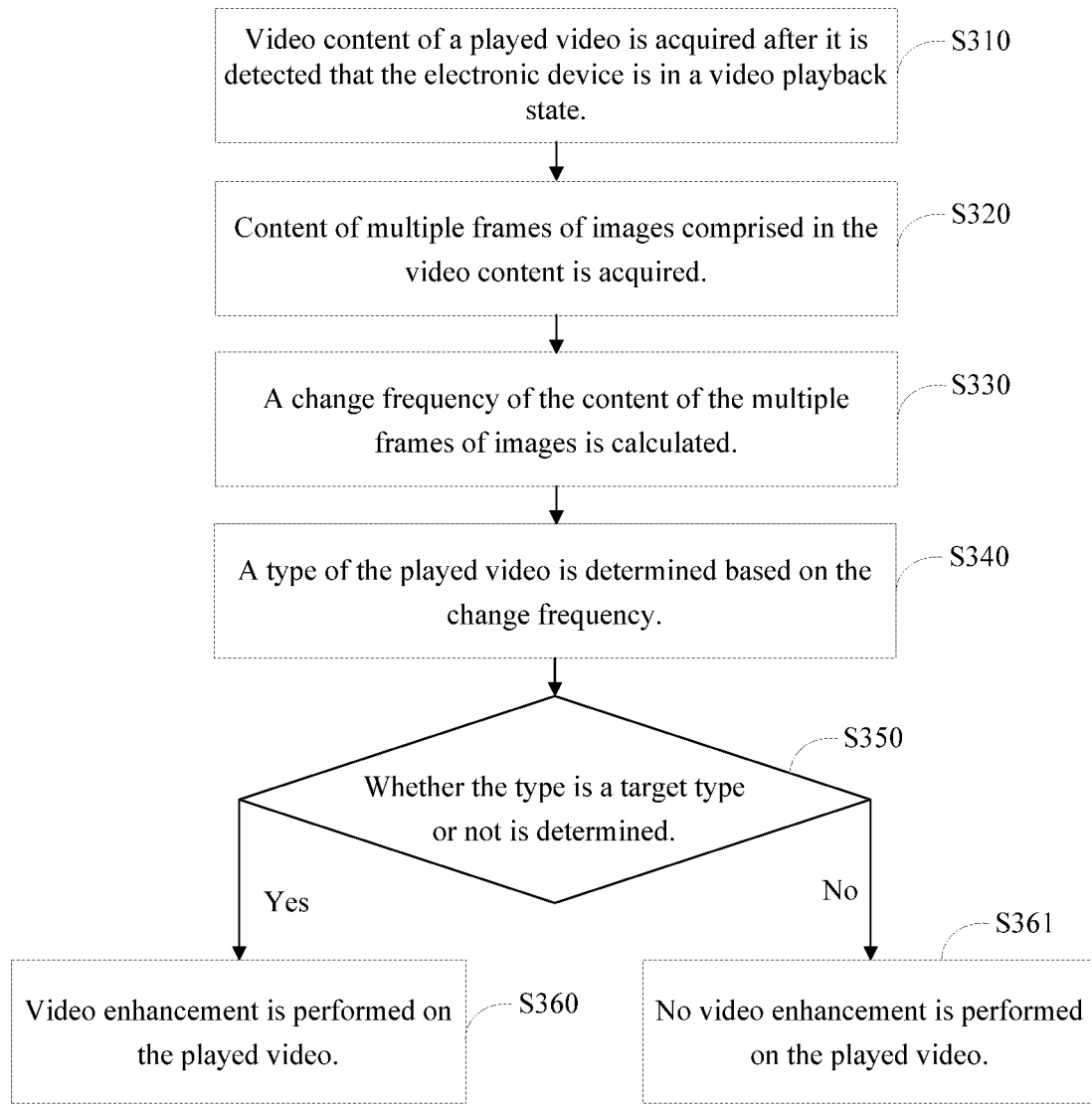
FIG. 8 is a flowchart of a method for controlling video enhancement according to still another embodiment of the present disclosure.

A description is provided with reference to FIG. 8. The present disclosure provides a method for controlling video enhancement applied to an electronic device. The method includes the steps as follows.

At block S310, video content of a played video is acquired after it is detected that the electronic device is in a video playback state.

Step S320: Content of multiple frames of images included in the video content is acquired.

As one method, the step of acquiring the content of the multiple frames of images includes acquiring content of a designated area of each of the multiple frames of images, and the designated area of each frame of image of the multiple frames of images being the same.

Figure 9:
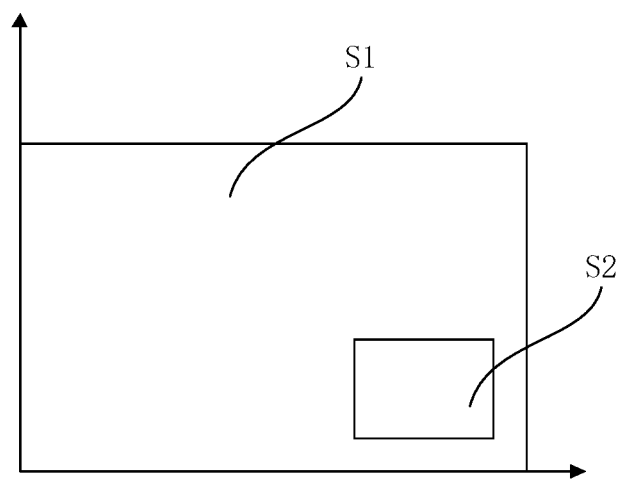
FIG. 9 is a schematic diagram of acquiring multiple frames of images of a method for controlling video enhancement according to still another embodiment of the present disclosure.

In this situation, the electronic device can establish a virtual coordinate system, position the each frame of image into the coordinate system, and then obtain an image of a designated area from the each frame of image based on the coordinate method as the content of the multiple frames of images. As shown in FIG. 9, in the virtual coordinate system, an area S2 in one frame of video picture 51 is the above designated area. Then for the multiple frames of images, content of locations within the area S2 in the figure that representing the each frame of image will be acquired as the content of the multiple frames of images.

As another method, the step of acquiring the content of the multiple frames of images includes acquiring multiple video content stages included in the played video along a playback time sequence; and acquiring content of at least one frame of image from each of the multiple video content stages to acquire the content of the multiple frames of images.

In order to obtain the frequency of video change more accurately, the content of the multiple frames of images can be acquired at intervals. Based on the above method, it can be determined that 10 ms is a video content stage, then content of 10 ms from the beginning of the video (the content represented by the first area filled in with the dotted lines along the arrow direction in FIG. 10) can be used as a video content stage. Then, after an interval of 2 ms, content of 10 ms starting from 12 ms (the content represented by the second area filled in with the dotted lines along the arrow direction in FIG. 10) is used as a video content stage, and then after the interval of 2 ms, content of 10 ms starting from 24 ms (the content represented by the third area filled in with the dotted lines along the arrow direction in FIG. 10) is used as a video content stage.

Figure 10:
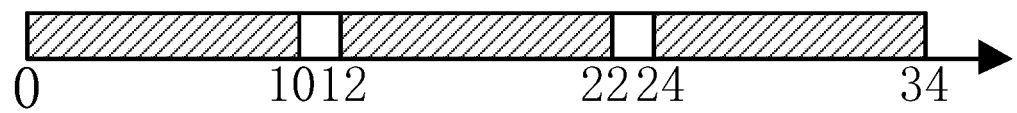
FIG. 10 is a schematic diagram of multiple video content stages of a method for controlling video enhancement according to still another embodiment of the present disclosure.

As shown in FIG. 10, in this situation, after the electronic device determines the three video content stages of FIG. 10, it will select a frame of image from the content represented by the first area filled in with the dotted lines, a frame of image from the content represented by the second area filled in with the dotted lines and a frame of image from the content represented by the third area filled in with the dotted lines. As a result, the three frames of images are acquired to be used as the content of the multiple frames of images.

The interval between the multiple video content stages (for example, the duration between the areas filled in with the dotted lines in FIG. 10) can be determined through a variety of methods. As one method, the electronic device can make a determination according to a preset method. As another method, it can be determined based on a total duration of the played video. In this method, optionally, a duration of the played video is obtained, and time parameters of the multiple video content stages are determined based on the duration. The time parameters include a duration of each of the video content stages, a number of the multiple video content stages, and at least one of the time intervals between the adjacent video content stages. In greater detail, the duration of each of the video content stages, the number of the multiple video content stages, and the time interval between the adjacent video content stages may be proportional to the total duration of the played video. That is, the longer the total duration of the played video is, the longer the duration of each of the video content stages, and the greater the number of the multiple video content stages, thus achieving more accurate and flexible acquisition of the content of the multiple frames of images.

It is noted that the duration of each of the video content stages, the number of the multiple video content stages, and the time interval between the adjacent video content stages shown in FIG. 10 are only examples for illustration, and the schemes provided by present disclosure are not limited in this regard.

At block S330, a change frequency of the content of the multiple frames of images is calculated.

As one method, after the electronic device acquires the content of the multiple frames of images, it can perform comparison based on content of each of images. If content of images of adjacent frames is inconsistent, it is determined that image content has changed to further compare a number of changes occurring in adjacent frames with a total number of frames of the multiple frames of images so as to obtain the change frequency. When the electronic device determines that a difference between the content of the images of the adjacent frames to be greater than a set ratio (for example, 90%), it determines that the content of the images of the adjacent frames is inconsistent.

At block S340, a type of the played video is determined based on the change frequency.

As one method, if the change frequency is lower than the set value, the video can be determined to be a teaching video. If the change frequency is not lower than the set value, the video can be determined to be a TV series video or a movie video.

At block S350, it is determined whether the type is a target type or not.

At block 360, video enhancement is performed on the played video in response to determining type of the played video being a target type.

At block S361, no video enhancement is performed on the played video in response to determining type of the played video being not the target type.

The method for controlling video enhancement according to the present disclosure acquires the video content of the played video after detecting that the electronic device is in the video playback state, and calculates the change frequency of the content of the multiple frames of images under the circumstances the acquired video content includes the content of the multiple frames of images, identifies the type of the played video based on the change frequency, and then determines whether the type is the target type or not. In response to determining type of the played video being a target type, video enhancement is performed on the played video. Therefore, through the present method, the type of the video can be determined based on the content of the played video, and whether the type is the target type or not is further determined to determine whether to perform video enhancement on the played video or not, which improves the flexibility of the activating method of video enhancement.

Figure 11:
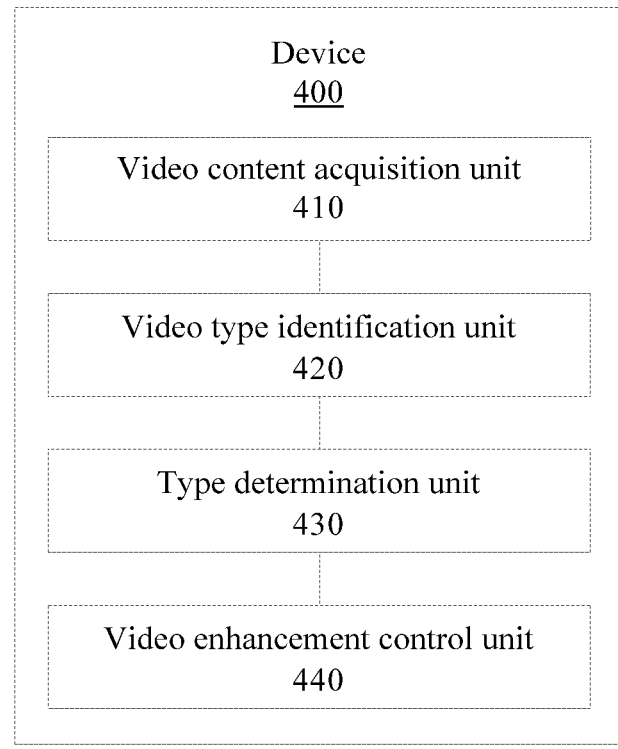
FIG. 11 is structural block diagram of a device for controlling video enhancement according to one embodiment of the present disclosure.

A description is provided with reference to FIG. 11. The present disclosure provides a device 400 for controlling video enhancement operating on an electronic device. The device 400 includes a video content acquisition unit 410, a video type identification unit 420, a type determination unit 430 and a video enhancement control unit 440.

The video content acquisition unit 410 is configured to acquire video content of a played video after detecting that the electronic device is in a video playback state.

The video type identification unit 420 is configured to identify a type of the played video based on the video content.

The type determination unit 430 is configured to determine whether the type is a target type of not.

The video enhancement control unit 440 is configured to perform video enhancement on the played video in response to determining type of the played video being a target type.

As one method, the video enhancement control unit 440 is configured to display a trigger control for activating video enhancement in response to determining type of the played video being a target type; if a touch operation acting on the trigger control is detected, video enhancement is performed on the played video.

Figure 12:
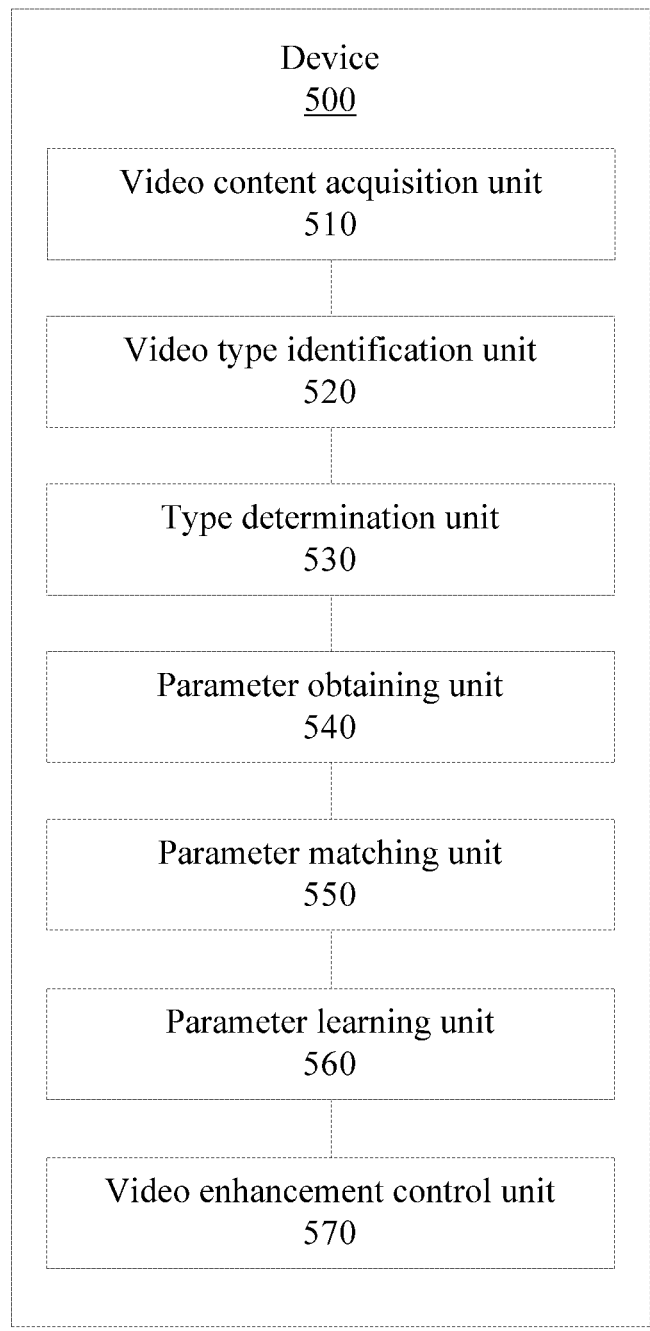
FIG. 12 is a structural block diagram of a device for controlling video enhancement according to another embodiment of the present disclosure.

A description is provided with reference to FIG. 12. The present disclosure provides a device 500 for controlling video enhancement operating on an electronic device. The device 500 includes a video content acquisition unit 510, a video type identification unit 520, a type determination unit 530, a parameter obtaining unit 540, a parameter matching unit 550, a parameter learning unit 560 and a video enhancement control unit 570.

The video content acquisition unit 510 is configured to acquire video content of a played video after detecting that the electronic device is in a video playback state.

The video type identification unit 520 is configured to identify a type of the played video based on the video content.

The type determination unit 530 is configured to determine whether the type is a target type or not.

The parameter obtaining unit 540 is configured to obtain a designated parameter of the played video in response to determining type of the played video being a target type.

The parameter matching unit 550 is configured to match the designated parameter with a reference parameter corresponding to the type of the played video.

As one method, the device 500 further includes the parameter learning unit 560 configured to acquire a designated number of videos of the type; and performing machine learning on the designated number of videos of the type to obtain the reference parameter corresponding to the type.

The video enhancement control unit 570 is configured to perform video enhancement on the played video if matching is successful.

Figure 13:
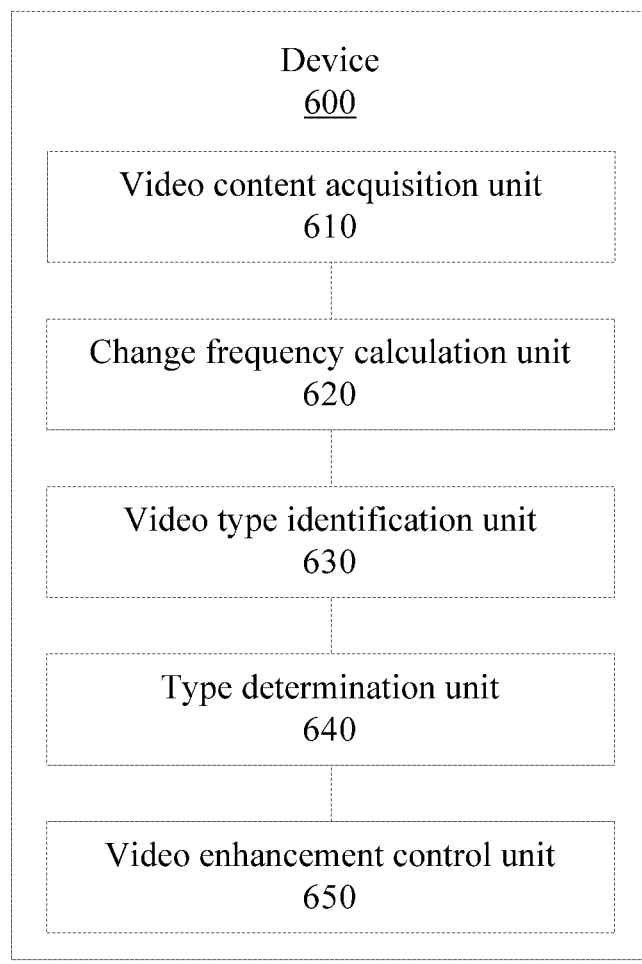
FIG. 13 is a structural block diagram of a device for controlling video enhancement according to still another embodiment of the present disclosure.

A description is provided with reference to FIG. 13. The present disclosure provides a device 600 for controlling video enhancement operating on an electronic device. The device 600 includes a video content acquisition unit 610, a change frequency calculation unit 620, a video type identification unit 630, a type determination unit 640 and a video enhancement control unit 650.

The video content acquisition unit 610 is configured to acquire video content of a played video after detecting that the electronic device is in a video playback state.

The video content acquisition unit 610 is further configured to acquire content of multiple frames of images included in the video content.

As one method, the video content acquisition unit 610 is configured to acquire content of a designated area of each of the multiple frames of images, and the designated area of each frame of image is the same.

As another method, the video content acquisition unit 610 is specifically configured to acquire multiple video content stages included in the played video along a playback time sequence; and acquiring content of at least one frame of image from each of the multiple video content stages to acquire the content of the multiple frames of images.

Optionally, the video content acquisition unit 610 is specifically configured to obtain a duration of the played video, and determine time parameters of the multiple video content stages based on the duration. The time parameters include a duration of each of the video content stages, a number of the multiple video content stages, and at least one of time intervals between the adjacent video content stages.

The change frequency calculation unit 620 is configured to calculate a change frequency of the content of the multiple frames of images.

The video type identification unit 630 is configured to determine a type of the played video based on the change frequency.

The type determination unit 640 is configured to determine whether the type is a target type of not.

The video enhancement control unit 650 is configured to perform video enhancement on the played video in response to determining type of the played video being a target type.

The video enhancement control unit 650 is configured not to perform video enhancement on the played video in response to determining type of the played video being not the target type.

Those skilled in the art can clearly understand that, for convenience and conciseness of the description, the detailed working processes of the devices and units described above can refer to the corresponding processes in the foregoing method embodiments, and a description in this regard is not repeated here. In the several embodiments provided by the present disclosure, the coupling between the modules may be electrical. In addition, the various functional modules in the various embodiments of the present disclosure may be integrated into one processing module, or each module may exist alone physically, or two or more modules may be integrated into one module. The above-mentioned integrated modules may be implemented in the form of hardware or software functional modules.

It is noted that encoding audio data according to the audio coding type in the present disclosure can adopt the currently existing technology, and a description in this regard is not provided in detail in the present disclosure.

In summary, the present disclosure provides the method for controlling video enhancement, the device, the electronic device and the storage medium. After detecting that the electronic device is in the video playback state, the video content of the played video is acquired, and the type of the played video is identified based on the video content, and then whether the type is the target type or not is determined. In response to determining type of the played video being a target type, video enhancement is performed on the played video. Therefore, through the present method, the type of the video can be determined based on the content of the played video, and whether the type is the target type or not is further determined to determine whether to perform video enhancement on the played video or not, which improves the flexibility of the activating method of video enhancement.

A description of an electronic device according to the present disclosure is provided with reference to FIG. 14 as follows.

Figure 14:
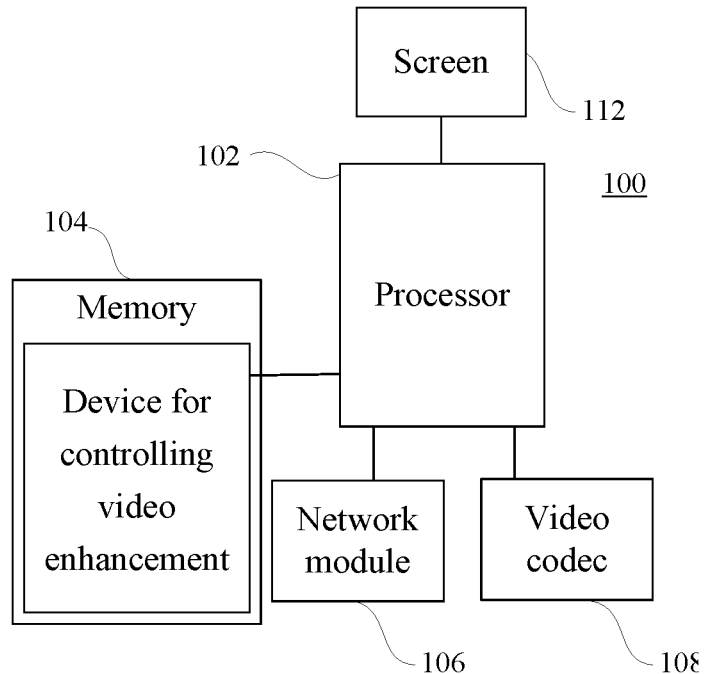
FIG. 14 is a structural block diagram of an electronic device according to one embodiment of the present disclosure for performing a method for controlling video enhancement according to one embodiment of the present disclosure.

A description is provided with reference to FIG. 14. Based on the above method for controlling video enhancement and device, an embodiment of the present disclosure further provides an electronic device 100 that can perform the above method for controlling video enhancement. The electronic device 100 includes one or more (only one is shown in the figure) processors 102, a memory 104, a network module 106, a video coder/decoder (codec) 108, a gesture acquisition module 110, and a screen 112 that are coupled to one other. A program that can execute the contents of the foregoing embodiments is stored in the memory 104, and the processor 102 can execute the program stored in the memory 104.

The processor 102 may include one or more processing cores. The processor 102 utilizes various interfaces and lines to connect various parts of the entire electronic device 100, and executes various functions of the electronic device 100 and processes data through running or executing instructions, programs, code sets, or instruction sets stored in the memory 104 and calling data stored in the memory 104. Optionally, the processor 102 may be implemented in a hardware form by using at least one of a digital signal processor (DSP), a field-programmable gate array (FPGA), and a programmable logic array (PLA). The processor 102 may be a combination by integrating one or more of a central processing unit (CPU), a graphics processor unit (GPU) and a modem, etc. The CPU mainly processes the operating system, the user interface, and application programs, etc.; the GPU is configured to render and depict the display content; the modem is configured to process wireless communication. It can be understood that the above modem may not be integrated into the processor 102, but may be implemented by a communication chip alone.

The memory 104 may include a random access memory (RAM), or may include a read-only memory. The memory 104 may be configured to store instructions, programs, codes, code sets or instruction sets. The memory 104 may include a program storage area and a data storage area. For example, a device for controlling video enhancement may be stored in the memory 104. The device for controlling video enhancement may be the above device 400, device 500, or device 600. The program storage area can store instructions used for implementing the operating system, instructions used for realizing at least one function (such as touch function, sound playback function, image playback function, etc.), instructions used for implementing the following various method embodiments, etc. The data storage area can store data created by the electronic device 100 during use (such as phone book, audio and video data, chat record data), etc.

The network module 106 is configured to receive and send electromagnetic waves, realize the mutual conversion between electromagnetic waves and electrical signals, so as to communicate with a communication network or some other devices, for example, communicate with a wireless access point. The network module 106 may include various currently existing circuit elements for performing these functions, such as an antenna, a radio frequency transceiver, a digital signal processor, an encryption/decryption chip, a subscriber identity module (SIM) card, a memory, etc. The network module 106 can communicate with various networks, such as the Internet, an intranet, a wireless network, or communicate with some other device through a wireless network. The wireless network may include a cellular telephone network, a wireless local area network, or a metropolitan area network.

The video codec 108 may be configured to decode data requested by the network module 106 from the network, so that it can be transmitted to the screen 112 for display. In greater detail, the video codec 108 may be a GPU, a specific DSP, an FPGA, an ASIC chip, etc.

The posture acquisition module 110 may be configured to acquire a posture of the electronic device 100. The posture acquisition module 110 includes a gyroscope and an acceleration sensor, and so on.

Figure 15:
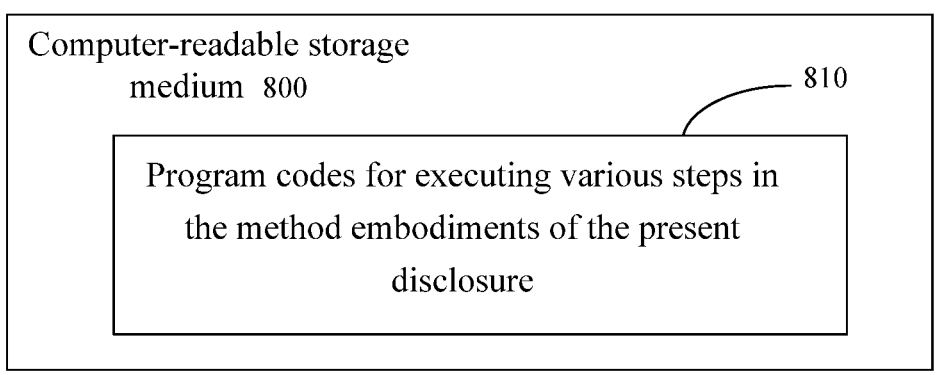
FIG. 15 is a storage unit according to one embodiment of the present disclosure for storing or carrying program codes for implementing a method for controlling video enhancement according to one embodiment of the present disclosure.

A description is provided with reference to FIG. 15, which shows a structural block diagram of a non-transitory computer-readable storage medium according to one embodiment of the present disclosure. A non-transitory computer-readable storage medium 800 stores program codes, and the program codes can be called by the processor 102 to perform the methods described in the foregoing method embodiments.

The non-transitory computer-readable storage medium 800 may be an electronic memory, such as a flash memory, an EEPROM, an EPROM, a hard disk, or a ROM. Optionally, the non-transitory computer-readable storage medium 800 includes a non-transitory computer-readable storage medium. The non-transitory computer-readable storage medium 800 has a storage space for executing program codes 810 of any method step in the above-mentioned methods. These program codes can be read from one or more computer program products or written into the one or more computer program products. The program codes 810 may be, for example, compressed in a suitable form.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:
1. A method for controlling video enhancement applied to an electronic device, the method comprising:
acquiring video content of a played video in response to detecting that the electronic device is in a video playback state, wherein the video content comprises content of multiple frames of images;
acquiring the content of the multiple frames of images;
calculating a change frequency of the content of the multiple frames of images;
determining a type of the played video based on the change frequency;
determining whether the type is a target type or not; and
performing video enhancement on the played video in response to determining type of the played video being a target type, the video enhancement comprising performing enhancement on an image of the played video.

2. The method as claimed in claim 1, wherein the step of performing video enhancement on the played video in response to determining type of the played video being a target type comprises:
obtaining a designated parameter of the played video in response to determining type of the played video being the target type;
matching the designated parameter with a reference parameter corresponding to the type of the played video; and
performing video enhancement on the played video when matching is successful.

3. The method as claimed in claim 2, wherein before the step of performing video enhancement on the played video in response to determining type of the played video being a target type, the method further comprises:
acquiring a designated number of videos of the type; and
performing machine learning on the designated number of videos of the type to obtain the reference parameter corresponding to the type.

4. The method as claimed in claim 1, wherein the step of determining the type of the played video based on the change frequency comprises:
determining the played video to be a teaching video when the change frequency is lower than a set value; and
determining the played video to be a TV series video or a movie video when the change frequency is not lower than the set value.

5. The method as claimed in claim 1, wherein the step of acquiring the content of the multiple frames of images comprises:
acquiring content of a designated area of each of the multiple frames of images, and the designated area of each frame of image of the multiple frames of images being the same.

6. The method as claimed in claim 1, wherein the step of acquiring the content of the multiple frames of images comprises:
acquiring multiple video content stages comprised in the played video along a playback time sequence; and
acquiring content of at least one frame of image from each of the multiple video content stages to acquire the content of the multiple frames of images.

7. The method as claimed in claim 1, further comprising:
obtaining a duration of the played video; and
determining time parameters of the multiple video content stages based on the duration, the time parameters comprising a duration of each of the video content stages, a number of the multiple video content stages, and at least one of time intervals between adjacent video content stages.

8. The method as claimed in claim 1, wherein the step of performing video enhancement on the played video in response to determining type of the played video being the target type comprises:
displaying a trigger control for activating video enhancement in response to determining type of the played video being the target type; and
performing video enhancement on the played video when a touch operation acting on the trigger control is detected.

9. The method as claimed in claim 1, wherein the step of performing video enhancement on the played video in response to determining type of the played video being a target type comprises:
obtaining a designated image parameter corresponding to the target type, the designated image parameter being selected from an image parameter of the played video; and
adjusting the designated image parameter to perform enhancement on the image of the played video.

10. The method as claimed in claim 9, wherein the image parameter comprises at least one of a definition adjustment parameter, a lens stretching control parameter, a color adjustment parameter, a sharpness adjustment parameter, a brightness adjustment parameter, a contrast adjustment parameter, a color gamut control parameter, a purity control parameter, a noise reduction control parameter and a saturation adjustment parameter.

11. The method as claimed in claim 1, further comprising:
not performing video enhancement on the played video in response to determining type of the played video being not the target type.

12. The method as claimed in claim 1, wherein before the step of acquiring the video content of the played video after it is detected that the electronic device is in the video playback state, the method comprises:
detecting whether there is a set video playback application running or not; and
determining that the electronic device is in the video playback state when it is detected that there is the set video playback application that is running.

13. The method as claimed in claim 1, wherein before the step of acquiring the video content of the played video after it is detected that the electronic device is in the video playback state, the method comprises:
obtaining an application currently running in a foreground;
detecting whether the application is on a pre-established list of video playback applications or not; and
determining that the electronic device is in the video playback state when it is on the pre-established list of video playback applications.

14. The method as claimed in claim 13, wherein the step of detecting whether the application is on the pre-established list of video playback applications or not comprises:
detecting a usage frequency of the application; and
determining that the application is on the pre-established list of video playback applications when the usage frequency exceeds a set frequency.

15. The method as claimed in claim 1, wherein before the step of acquiring the video content of the played video after it is detected that the electronic device is in the video playback state, the method comprises:
determining whether there is an audio output or not;
detecting whether there is a video playback application running or not when there is the audio output; and
determining that the electronic device is in the video playback state when there is the video playback application running.

16. An electronic device comprising one or more processors, a video coder/decoder and a memory;
one or more program instructions stored in the memory and executable by the one or more processors to perform operations comprising:
acquiring video content of a played video after it is detected that the electronic device is in a video playback state, wherein the video content comprises content of multiple frames of images;
acquiring the content of the multiple frames of images;
calculating a change frequency of the content of the multiple frames of images;

determining a type of the played video based on the change frequency;

determining whether the type is a target type or not; and performing video enhancement on the played video in response to determining type of the played video being the target type, the video enhancement comprising performing enhancement on an image of the played video.

17. The electronic device as claimed in claim 16, wherein the operations further comprise:

not to perform video enhancement on the played video in response to determining type of the played video being not the target type.

18. A non-transitory computer-readable storage medium storing one or more program codes executable by a processor to perform operations comprising:

acquiring video content of a played video after it is detected that the electronic device is in a video playback state, wherein the video content comprises content of multiple frames of images;

acquiring the content of the multiple frames of images;

calculating a change frequency of the content of the multiple frames of images;

determining a type of the played video based on the change frequency;

determining whether the type is a target type or not; and performing video enhancement on the played video in response to determining type of the played video being a target type, the video enhancement comprising performing enhancement on an image of the played video.

19. The non-transitory computer-readable storage medium as claimed in claim 18, wherein the operations further comprise: not to perform video enhancement on the played video in response to determining type of the played video being not the target type.

* * * * *